United States Patent
Ando et al.

(10) Patent No.: US 12,394,406 B2
(45) Date of Patent: Aug. 19, 2025

(54) PARALINGUISTIC INFORMATION ESTIMATION MODEL LEARNING APPARATUS, PARALINGUISTIC INFORMATION ESTIMATION APPARATUS, AND PROGRAM

(71) Applicant: NIPPON TELEGRAPH AND TELEPHONE CORPORATION, Tokyo (JP)

(72) Inventors: Atsushi Ando, Tokyo (JP); Hosana Kamiyama, Tokyo (JP); Satoshi Kobashikawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 669 days.

(21) Appl. No.: 17/428,961

(22) PCT Filed: Jan. 27, 2020

(86) PCT No.: PCT/JP2020/002649
§ 371 (c)(1),
(2) Date: Aug. 5, 2021

(87) PCT Pub. No.: WO2020/162239
PCT Pub. Date: Aug. 13, 2020

(65) Prior Publication Data
US 2022/0122584 A1 Apr. 21, 2022

(30) Foreign Application Priority Data
Feb. 8, 2019 (JP) .................................. 2019-021332

(51) Int. Cl.
*G10L 25/63* (2013.01)
*G10L 15/02* (2006.01)
(Continued)

(52) U.S. Cl.
CPC .............. *G10L 15/06* (2013.01); *G10L 15/02* (2013.01); *G10L 15/16* (2013.01); *G10L 25/63* (2013.01);
(Continued)

(58) Field of Classification Search
None
See application file for complete search history.

(56) References Cited

U.S. PATENT DOCUMENTS 9,761,220 B2 * 9/2017 Levit ...................... G10L 15/19
10,147,424 B1 * 12/2018 Indyk ..................... G10L 15/22
(Continued)

FOREIGN PATENT DOCUMENTS

JP 2005346471 A * 12/2005

OTHER PUBLICATIONS

Machine translation of JP-2005346471-A. (Year: 2005).*
(Continued)

*Primary Examiner* — Richard Z Zhu

(57) ABSTRACT

Paralinguistic information is estimated with high accuracy even when an utterance for which it is difficult to identify paralinguistic information is used for model learning. An acoustic feature extraction unit 11 extracts an acoustic feature from an utterance. An anti-teacher decision unit 12 decides, based on a paralinguistic information label indicating a determination result of paralinguistic information given by a plurality of listeners for each utterance, an anti-teacher label indicating an anti-teacher serving as incorrect paralinguistic information for the utterance. An anti-teacher estimation model learning unit 13 learns, based on an acoustic feature extracted from the utterance and the anti-teacher label, an anti-teacher estimation model for outputting a posterior probability of anti-teacher for an input acoustic feature.

12 Claims, 14 Drawing Sheets

(51) Int. Cl.
  *G10L 15/06* (2013.01)
  *G10L 15/16* (2006.01)
  *G10L 15/07* (2013.01)
  *G10L 25/03* (2013.01)
  *G10L 25/06* (2013.01)
  *G10L 25/09* (2013.01)
  *G10L 25/12* (2013.01)
  *G10L 25/18* (2013.01)
  *G10L 25/21* (2013.01)
  *G10L 25/24* (2013.01)
  *G10L 25/30* (2013.01)

(52) U.S. Cl.
  CPC .......... *G10L 15/063* (2013.01); *G10L 15/075* (2013.01); *G10L 25/03* (2013.01); *G10L 25/06* (2013.01); *G10L 25/09* (2013.01); *G10L 25/12* (2013.01); *G10L 25/18* (2013.01); *G10L 25/21* (2013.01); *G10L 25/24* (2013.01); *G10L 25/30* (2013.01)

(56) References Cited

U.S. PATENT DOCUMENTS

| | | | |
|---|---|---|---|
| 10,482,352 B2* | 11/2019 | Osada | G06V 40/174 |
| 11,004,461 B2* | 5/2021 | Howard | G16H 50/20 |
| 11,151,182 B2* | 10/2021 | Wang | G06F 18/28 |
| 11,630,957 B2* | 4/2023 | Wang | G06F 40/30 704/9 |
| 2012/0089396 A1* | 4/2012 | Patel | G10L 25/00 704/E15.005 |
| 2021/0090592 A1* | 3/2021 | Lee | G10L 15/26 |
| 2021/0142164 A1* | 5/2021 | Liu | G06F 40/216 |
| 2021/0201205 A1* | 7/2021 | Chatterjee | G06N 3/02 |

OTHER PUBLICATIONS

PCT / JP2020 / 002649 search report. (Year: 2020).*
JPO decision to grant a patent on JP2019-021332 (Year: 2022).*
Mirsamadi et al. (2017) "Automatic speech emotion recognition using recurrent neural networks with local attention" ICASSP, Mar. 5, 2017, pp. 2227-2231.

* cited by examiner

PARALINGUISTIC INFORMATION ESTIMATION MODEL LEARNING APPARATUS, PARALINGUISTIC INFORMATION ESTIMATION APPARATUS, AND PROGRAM

CROSS-REFERENCE TO RELATED APPLICATIONS

This application is a U.S. 371 Application of International Patent Application No. PCT/JP2020/002649, filed on 27 Jan. 2020, which application claims priority to and the benefit of JP Application No. 2019-021332, filed on 8 Feb. 2019, the disclosures of which are hereby incorporated herein by reference in their entireties.

TECHNICAL FIELD

The present invention relates to a technique for estimating paralinguistic information from speech.

BACKGROUND ART

There is a need for a technique for estimating paralinguistic information (e.g., emotions being joy, sadness, anger, or calm) from speech. Paralinguistic information is applicable to dialogue control that takes into account emotions of the other party in voice dialogue (e.g., changing the topic if the other party is angry, etc.), and mental health diagnosis using speech (e.g., daily speech being recorded to predict mental health conditions from the frequency of sad and angry voices, etc.).

As a conventional technique, NPL 1 discloses a paralinguistic information estimation technique based on machine learning. In NPL 1, as illustrated in FIG. 1, paralinguistic information of a speaker is estimated on input of time-series information of acoustic features (e.g., voice pitch) extracted from speech for each short time frame. At this time, an estimation model is used that is based on deep learning in which a recurrent neural network (RNN) and a function called an attention mechanism are combined so that it is possible to estimate the paralinguistic information based on partial characteristics of speech (e.g., a sharply reduced volume of voice at the end of speech can be estimated to be a sad feeling). In recent years, paralinguistic information estimation models based on deep learning as in NPL 1 have become mainstream.

Note that in the conventional technique, only when a plurality of listeners listen to a certain speech and the majority of the listeners feel specific paralinguistic information for the speech, the specific paralinguistic information is determined to be the correct paralinguistic information. In the conventional technique, learning is performed so as to estimate the correct paralinguistic information.

CITATION LIST

Non Patent Literature

[NPL 1] S. Mirsamadi, E. Barsoum, and C. Zhang, "Automatic speech emotion recognition using recurrent neural networks with local attention", in Proc. of ICASSP, 2017, pp. 2227-2231.

SUMMARY OF THE INVENTION

Technical Problem

However, even if the conventional technique is used, the accuracy of paralinguistic information estimation may be insufficient. This is because, in the conventional technique, which learns the estimation model to identify the only correct paralinguistic information in speech, the identifying of the correct paralinguistic information is a difficult task even for humans. For example, in emotion estimation (e.g., a problem of estimating one of joy, sadness, anger, and calm) which is a type of paralinguistic information estimation, the conventional technique uses a pair of a certain speech and the correct emotion as learning data to learn the emotion estimation model. However, in reality, there are many utterances for which it is difficult to identify the correct emotion. For example, in a case of three listeners being, there may be an utterance for which two listeners judge "joy" and one listener judges "calm" (in this case, the correct emotion is "joy" in the conventional technique). It is difficult to learn the characteristics inherent in correct emotions (i.e., "joy") from such utterances. As a result, it becomes difficult to correctly learn the estimation model, and the accuracy of paralinguistic information estimation may decrease.

In view of the technical problems as described above, an object of the present invention is to estimate paralinguistic information with high accuracy even when an utterance for which it is difficult to identify paralinguistic information is used for model learning.

Means for Solving the Problem

A paralinguistic information estimation model learning device according to a first aspect of the present invention includes an anti-teacher decision unit that decides, based on a paralinguistic information label indicating a determination result of paralinguistic information given by a plurality of listeners for each utterance, an anti-teacher label indicating an anti-teacher serving as incorrect paralinguistic information for the utterance; and an anti-teacher estimation model learning unit that learns, based on an acoustic feature extracted from the utterance and the anti-teacher label, an anti-teacher estimation model for outputting a posterior probability of anti-teacher for an input acoustic feature.

A paralinguistic information estimation model learning device according to a second aspect of the present invention includes an anti-teacher decision unit that decides, based on a paralinguistic information label indicating a determination result of paralinguistic information given by a plurality of listeners for each utterance, an anti-teacher label indicating an anti-teacher serving as incorrect paralinguistic information for the utterance; a traditional teacher decision unit that decides, based on a paralinguistic information label, a traditional teacher label indicating a traditional teacher serving as correct paralinguistic information for the utterance; and a multi-task estimation model learning unit that performs multi-task learning based on an acoustic feature extracted from the utterance, the anti-teacher label, and the traditional teacher label, and learns a multi-task estimation model for outputting a posterior probability of anti-teacher and a posterior probability of traditional teacher for an input acoustic feature.

A paralinguistic information estimation device according to a third aspect of the present invention includes an anti-teacher estimation model storage unit that stores the anti-teacher estimation model learned by the paralinguistic information estimation model learning device according to the first aspect; and a paralinguistic information estimation unit that estimates, based on a posterior probability of anti-teacher obtained by inputting an acoustic feature extracted from an input utterance into the anti-teacher estimation model, paralinguistic information of the input utterance.

A paralinguistic information estimation device according to a fourth aspect of the present invention includes a multi-task estimation model storage unit that stores the multi-task estimation model learned by the paralinguistic information estimation model learning device according to the second aspect; and a paralinguistic information estimation unit that estimates, based on the posterior probability of traditional teacher obtained by inputting an acoustic feature extracted from an input utterance into the multi-task estimation model, paralinguistic information of the input utterance.

Effects of the Invention

According to the present invention, it is possible to estimate paralinguistic information with high accuracy even when an utterance for which it is difficult to identify paralinguistic information is used for model learning.

DESCRIPTION OF EMBODIMENTS

Figure 1:
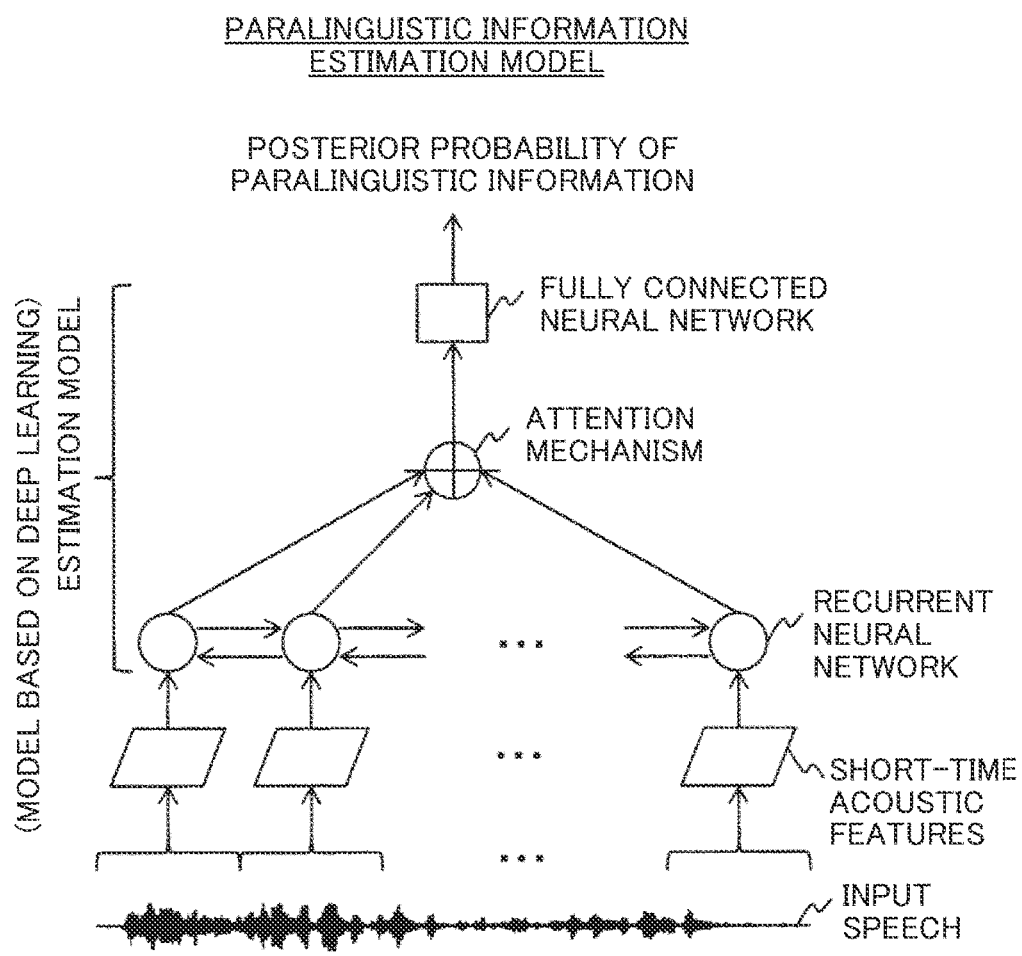
FIG. 1 is a diagram for explaining a conventional paralinguistic information estimation model.

The symbol "^" used in the following description should be set immediately above the character immediately after correctly, but due to the limitation of the text notation, it is set immediately before the character. In the formulas, such a symbol is set in its original position, that is, immediately above the character. For example, "^c" is expressed by the following expression in equations.

$$\hat{c} \qquad \text{[Formula 1]}$$

Hereinafter, embodiments of the present invention will be described. Note that, in the drawings, components having the same function are denoted by the same reference numerals, and duplicate description will be omitted.

[Points of Invention]

A point of the present invention is intentional estimation of "paralinguistic information that is absolutely incorrect", thereby contributing to the identification of the correct paralinguistic information. While it is difficult for humans to identify the only correct paralinguistic information, it is generally easy to estimate absolutely-incorrect paralinguistic information. For example, when a human listens to a speech, it may be difficult to identify the speech as expressing joy or calm, but it is often possible to judge that such a speech does not express "anger" or "sadness". From this, it may be easier to estimate absolutely-incorrect paralinguistic information than to identify the correct paralinguistic information, and it is expected that the incorrect paralinguistic information can be estimated with high accuracy. Further, knowing absolutely-incorrect paralinguistic information by using a framework such as an elimination method can contribute to the identification of the only correct paralinguistic information. Hereinafter, the only correct paralinguistic information will be referred to as "traditional teacher", and the absolutely-incorrect paralinguistic information will be referred to as "anti-teacher".

In order to realize the above point of the invention, the embodiments described below are configured as follows.

1. In the embodiments described below, an anti-teacher is decided based on a result of determining paralinguistic information by a plurality of listeners. In the present invention, the anti-teacher refers to a piece of paralinguistic information determined by a certain number of listeners or less (e.g., 10% or less) among pieces of paralinguistic information to be estimated. For example, for four classes of emotion estimation: joy, sadness, anger, and calm, if three listeners judge a certain speech as expressing "joy", "joy", and "calm", respectively, the anti-teacher of that speech refers to two classes: "sadness" and "anger".

2. The embodiments described below learns an estimation model for the anti-teacher. This estimation model has the same input features and estimation model structure as the conventional technique, but the final estimation stage implements a model having a multi-label classification structure (one speech can be classified into multiple classes at the same time).

3. The embodiments described below estimate paralinguistic information by using the estimation model for anti-teacher alone or both the estimation model for anti-teacher and the estimation model for traditional teacher. In the case where the estimation model for anti-teacher is used alone, the embodiments described below perform anti-teacher estimation using the estimation model for anti-teacher, and determines the class with the smallest output probability (i.e., the class with the smallest probability of absolutely-incorrect paralinguistic information) to be a correct paralinguistic information estimation result. In the case where both the estimation model for anti-teacher and the estimation model for traditional teacher are used, the embodiments described below determine the class with the largest value obtained by subtracting the output probability of the estimation model for anti-teacher from the output probability of the estimation model for traditional teacher to be a correct paralinguistic information estimation result. Here, the value obtained by subtracting the output probability of the estimation model for anti-teacher from the output probability of the estimation model for traditional teacher is, that is, a value obtained by subtracting the probability of incorrect paralinguistic information from the probability of the correct paralinguistic information.

First Embodiment

In a first embodiment, paralinguistic information is estimated by using the estimation model for anti-teacher alone.
<Paralinguistic Information Estimation Model Learning Device 1>

Figure 2:
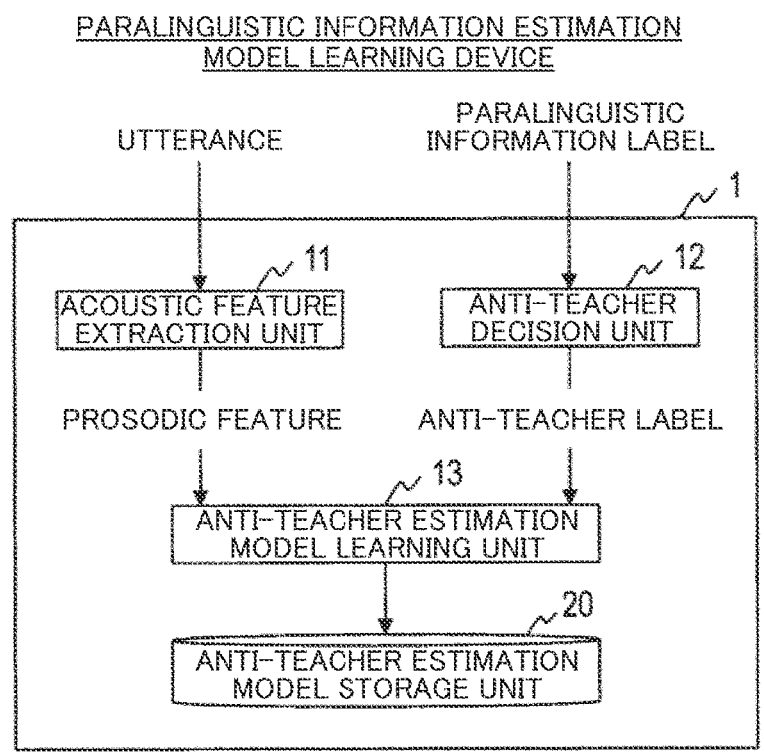
FIG. 2 is a diagram illustrating a functional configuration of a paralinguistic information estimation model learning device according to a first embodiment.
Figure 3:
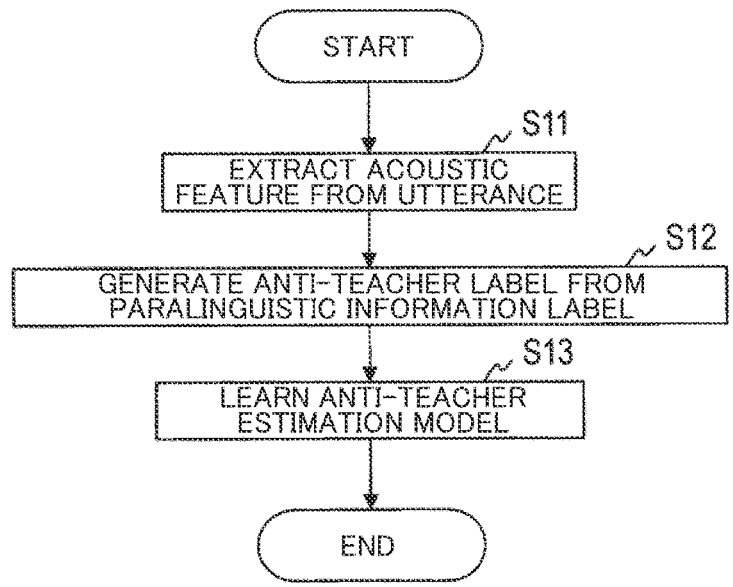
FIG. 3 is a diagram illustrating a processing procedure of a paralinguistic information estimation model learning method according to the first embodiment.

A paralinguistic information estimation model learning device according to the first embodiment learns an anti-teacher estimation model by using learning data that includes a plurality of utterances and paralinguistic information labels each indicating a determination result of paralinguistic information given by a plurality of listeners for an utterance. As illustrated in FIG. 2, a paralinguistic information estimation model learning device 1 according to the first embodiment includes an acoustic feature extraction unit 11, an anti-teacher decision unit 12, an anti-teacher estimation model learning unit 13, and an anti-teacher estimation model storage unit 10. This paralinguistic information estimation model learning device 1 implements a paralinguistic information estimation model learning method according to the first embodiment by performing steps of processing by way of example illustrated in FIG. 3.

The paralinguistic information estimation model learning device 1 is, for example, a special device configured by loading a special program onto a known or dedicated computer having a central processing unit (CPU), a main storage device (RAM: Random Access Memory), and the like. The paralinguistic information estimation model learning device 1 executes each step of processing under the control of the central processing unit, for example. Data input to the paralinguistic information estimation model learning device 1 and data obtained by each step of processing are stored in the main storage device, for example, and the data stored in the main storage device is read to the central processing unit as needed so that it is used for other steps of processing. At least a part of each processing unit of the paralinguistic information estimation model learning device 1 may be composed of hardware such as an integrated circuit. Each storage unit included in the paralinguistic information estimation model learning device 1 can be composed of, for example, a main storage device such as RAM (Random Access Memory), an auxiliary storage device composed of a hard disk, an optical disk, or a semiconductor memory element such as a flash memory (Flash Memory), or middleware such as a relational database or a key-value store.

In step S11, the acoustic feature extraction unit 11 extracts a prosodic feature from an utterance in the learning data. The prosodic feature is a vector including one or more features of fundamental frequency, short-time power, Mel-frequency Cepstral Coefficients (MFCC), zero crossover rate, Harmonics-to-Noise-Ratio (HNR), and Mel-filter bank output. Further, the prosodic feature may be a series vector time by time (frame by frame) for these features, or may be a vector on a certain time basis or a vector of overall utterance statistics (mean, variance, maximum, minimum, gradient, etc.) for these features. The acoustic feature extraction unit 11 outputs the extracted prosodic feature to the anti-teacher estimation model learning unit 13.

In step S12, the anti-teacher decision unit 12 decides an anti-teacher label from a paralinguistic information label of the learning data. The anti-teacher refers to a piece of paralinguistic information determined by a predetermined threshold number (hereinafter referred to as "anti-teacher threshold value") of listeners or less (e.g., 10% or less) among pieces of paralinguistic information to be estimated. The anti-teacher label refers to a vector in which the paralinguistic information class of the anti-teacher is 1 and the others are 0. In other words, the anti-teacher label is not a vector in which one paralinguistic information class is 1 and the others are 0 as in the traditional teacher but a vector in which at least one or more paralinguistic information classes are 1. For example, in the four-class emotion estimation of joy, sadness, anger, and calm, if the anti-teacher threshold is set to 0.1 and three listeners judge a certain speech as "joy", "joy", and "calm", respectively, the anti-teacher label for that speech refers to a four-dimensional vector in which two classes of "sadness" and "anger" are 1 and two classes of "joy" and "calm" are 0.

The anti-teacher label is specifically expressed as follows.

$$t^* = \begin{bmatrix} t_1^* \\ \vdots \\ t_K^* \end{bmatrix},$$ [Formula 2]

$$t_k^* = \begin{cases} 1 & \text{if } \frac{1}{N}\sum_{n=1}^{N} h_k^n \le \beta \\ 0 & \text{otherwise} \end{cases}$$

Here, $h_k^n$ indicates whether or not the n-th listener felt the k-th paralinguistic information class (1 if the listener did, 0 otherwise). K is the total number of paralinguistic information classes. N is the total number of listeners. R is an anti-teacher threshold of 0 or more and 1 or less.

The anti-teacher label may be given as an anti-teacher to a paralinguistic information class that has not been determined by any listener. This corresponds to the case where the anti-teacher threshold p is set to 0.

The anti-teacher decision unit 12 outputs the decided anti-teacher label to the anti-teacher estimation model learning unit 13.

In step S13, the anti-teacher estimation model learning unit 13 learns the anti-teacher estimation model based on the prosodic feature output by the acoustic feature extraction unit 11 and the anti-teacher label output by the anti-teacher decision unit 12. As the estimation model, a model is used here that can handle a multi-label classification problem (a classification problem in which one speech can be classified into multiple classes at the same time). This is because anti-teachers may appear in multiple classes for one speech. The estimation model may be a model based on deep learning as in the conventional technique, or may be a multiclass logistic regression, but the output here can be expressed as a probability value (probability that a certain paralinguistic information class is 1). The anti-teacher estimation model learning unit 13 stores the learned anti-teacher estimation model in the anti-teacher estimation model storage unit 20.

<Paralinguistic Information Estimation Device 2>

Figure 4:
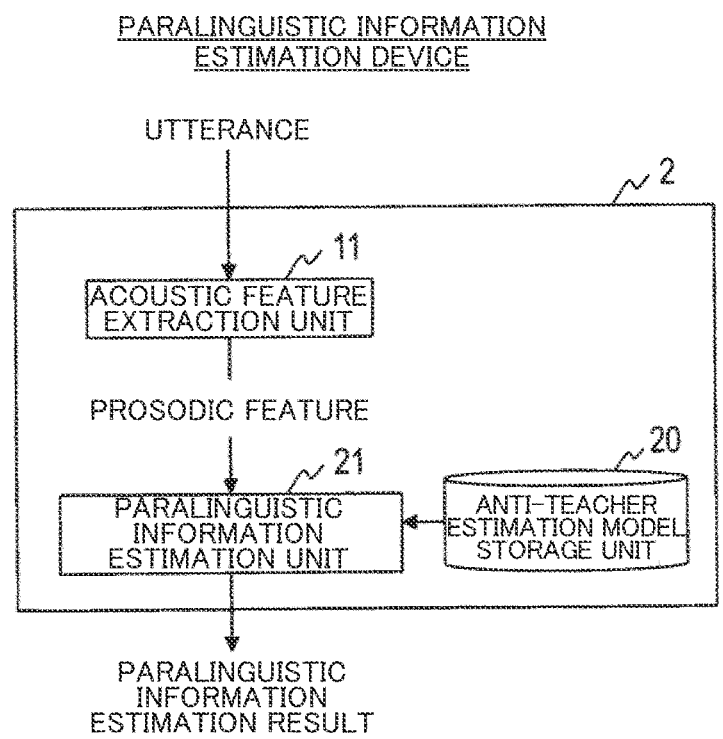
FIG. 4 is a diagram illustrating a functional configuration of a paralinguistic information estimation device according to the first embodiment.
Figure 5:
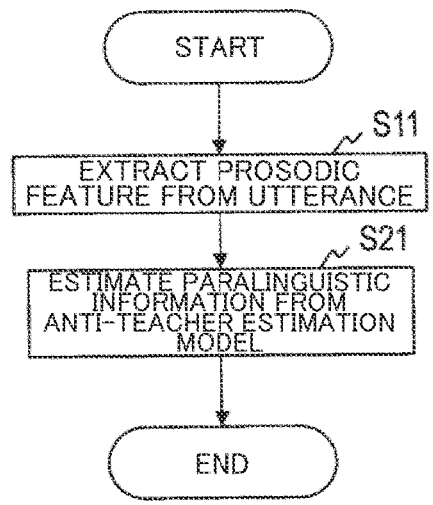
FIG. 5 is a diagram illustrating a processing procedure of a paralinguistic information estimation method according to the first embodiment.

A paralinguistic information estimation device according to the first embodiment estimates paralinguistic information of an input utterance by using the learned anti-teacher estimation model. As illustrated in FIG. 4, a paralinguistic information estimation device 2 according to the first embodiment includes an acoustic feature extraction unit 11, an anti-teacher estimation model storage unit 20, and a paralinguistic information estimation unit 21. This paralinguistic information estimation device 2 implements a paralinguistic information estimation method according to the first embodiment by performing steps of processing by way of example illustrated in FIG. 5.

The paralinguistic information estimation device 2 is, for example, a special device configured by loading a special program onto a known or dedicated computer having a central processing unit (CPU), a main storage device (RAM: Random Access Memory), and the like. The paralinguistic information estimation device 2 executes each step of processing under the control of the central processing unit, for example. Data input to the paralinguistic information estimation device 2 and data obtained by each step of processing are stored in the main storage device, for example, and the data stored in the main storage device is read to the central processing unit as needed so that it is used for other steps of processing. At least a part of each processing unit of the paralinguistic information estimation device 2 may be composed of hardware such as an integrated circuit. Each storage unit included in the paralinguistic information estimation device 2 can be composed of, for example, a main storage device such as RAM (Random Access Memory), an auxiliary storage device composed of a hard disk, an optical disk, or a semiconductor memory element such as a flash memory (Flash Memory), or middleware such as a relational database or a key-value store.

The anti-teacher estimation model storage unit 20 stores the anti-teacher estimation model learned by the paralinguistic information estimation model learning device 1.

In step S11, the acoustic feature extraction unit 11 extracts a prosodic feature from the input utterance. The extraction of the prosodic feature can be performed in the same manner as in the paralinguistic information estimation model learning device 1. The acoustic feature extraction unit 11 outputs the extracted prosodic feature to the paralinguistic information estimation unit 21.

In step S21, the paralinguistic information estimation unit 21 estimates paralinguistic information from the prosodic feature output by the acoustic feature extraction unit 11 based on the anti-teacher estimation model stored in the anti-teacher estimation model storage unit 20. In the estimation, the class with the lowest output of the anti-teacher estimation model for a certain prosodic feature is regarded as a paralinguistic information estimation result. This corresponds to selecting paralinguistic information that is least likely to be an anti-teacher, that is, paralinguistic information that is not considered to be "absolutely-incorrect paralinguistic information". The paralinguistic information estimation unit 21 outputs the estimation result of the paralinguistic information as an output of the paralinguistic information estimation device 2.

Second Embodiment

In a second embodiment, paralinguistic information is estimated using the estimation model for traditional teacher in addition to the estimation model for anti-teacher. At this time, the paralinguistic information is estimated based on a weight difference in the output results of the estimation models. This corresponds to performing paralinguistic information estimation in consideration of both "probability that certain paralinguistic information is correct" and "probability that certain paralinguistic information is incorrect". As a result, the estimation accuracy of the paralinguistic information is improved as compared with the case where only one of the probabilities is taken into consideration (i.e., each of the conventional technique and the first embodiment).

<Paralinguistic Information Estimation Model Learning Device 3>

Figure 6:
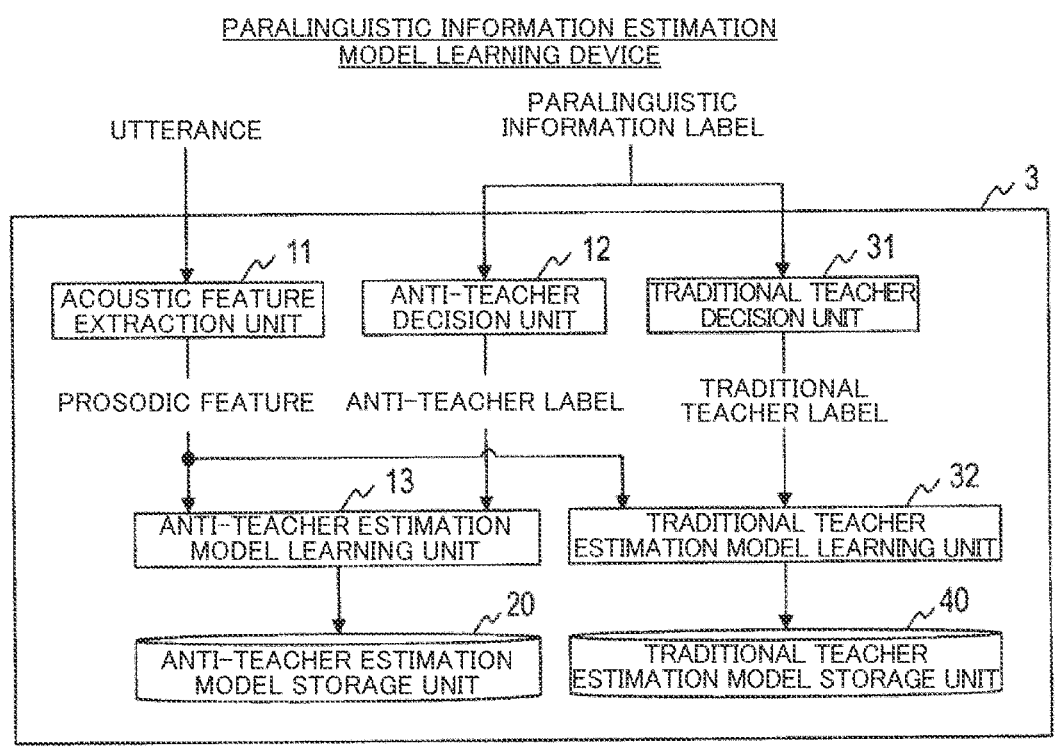
FIG. 6 is a diagram illustrating a functional configuration of a paralinguistic information estimation model learning device according to a second embodiment.
Figure 7:
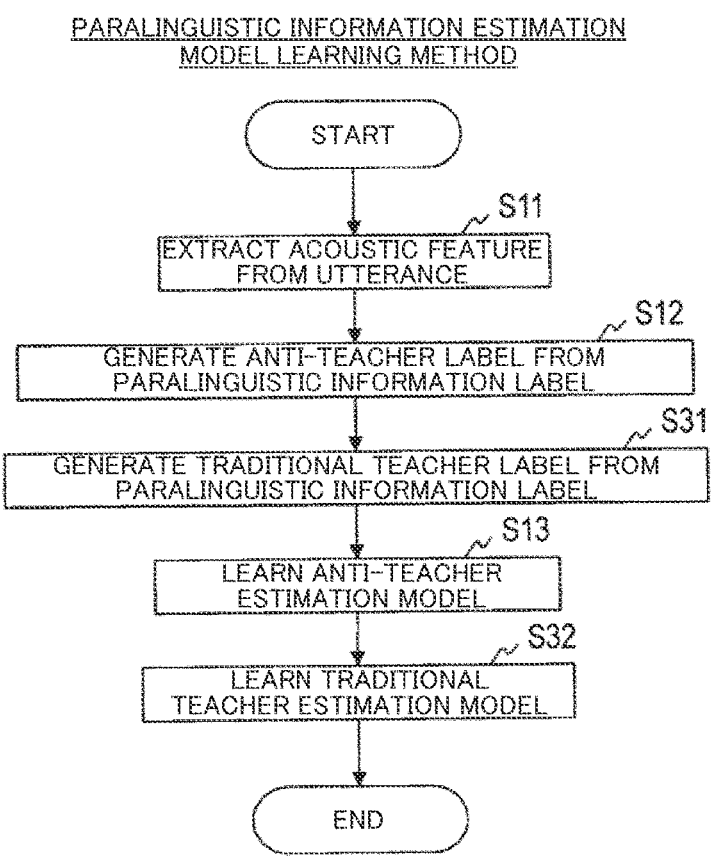
FIG. 7 is a diagram illustrating a processing procedure of a paralinguistic information estimation model learning method according to the second embodiment.

A paralinguistic information estimation model learning device according to the second embodiment learns the anti-teacher estimation model and the traditional teacher estimation model from the same learning data as in the first embodiment. As illustrated in FIG. 6, the paralinguistic information estimation model learning device 3 according to the second embodiment further includes a traditional teacher decision unit 31, a traditional teacher estimation model learning unit 32, and a traditional teacher estimation model storage unit 40 in addition to the acoustic feature extraction unit 11, the anti-teacher decision unit 12, the anti-teacher estimation model learning unit 13, and the anti-teacher estimation model storage unit 20 of the first embodiment. This paralinguistic information estimation model learning device 3 implements a paralinguistic information estimation model learning method according to the second embodiment by performing steps of processing by way of example illustrated in FIG. 7.

Hereinafter, the paralinguistic information estimation model learning device 3 according to the second embodiment will be described with a focus on the differences from the paralinguistic information estimation model learning device 1 according to the first embodiment.

In step S31, the traditional teacher decision unit 31 decides a traditional teacher label from a paralinguistic information label of the learning data. The traditional teacher label is a vector in which the paralinguistic information class is set to 1 and the other paralinguistic information classes are set to 0 if the majority of all listeners judge the same paralinguistic information for a certain speech, as in the conventional technique. If the majority does not judge the same paralinguistic information, that speech is not used for model learning as no correct paralinguistic information. For example, in the four-class emotion estimation of joy, sadness, anger, and calm, if three listeners judge a certain speech as "joy", "joy", and "calm", respectively, the traditional teacher label for that speech refers to a four-dimensional vector in which the "joy" class is 1 and the remaining three classes of "sadness", "anger", and "calm" are 0. The traditional teacher decision unit 31 outputs the determined traditional teacher label to the traditional teacher estimation model learning unit 32.

In step S32, the traditional teacher estimation model learning unit 32 learns the traditional teacher estimation model based on the prosodic feature output by the acoustic feature extraction unit 11 and the traditional teacher label output by the traditional teacher decision unit 31. As the estimation model, a model is used here that can handle a multi-class classification problem (a classification problem that classifies one speech into one class). The estimation model may be a model based on deep learning as in the conventional technique, or may be a multiclass logistic regression, but the output here can be expressed as a probability value (probability that a certain paralinguistic information class is 1). The traditional teacher estimation model learning unit 32 stores the learned traditional teacher estimation model in the traditional teacher estimation model storage unit 40.

<Paralinguistic Information Estimation Device 4>

Figure 8:
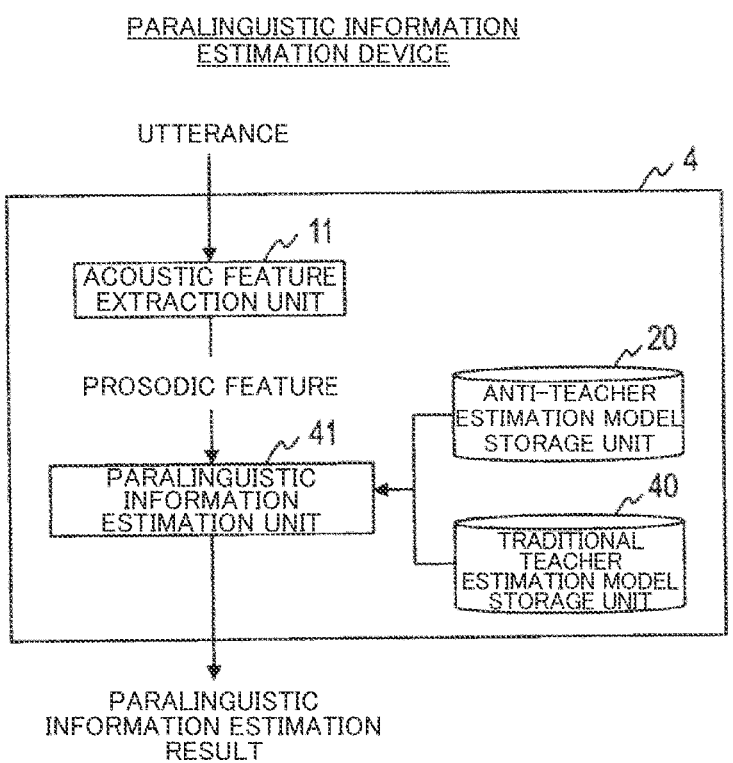
FIG. 8 is a diagram illustrating a functional configuration of a paralinguistic information estimation device according to the second embodiment.
Figure 9:
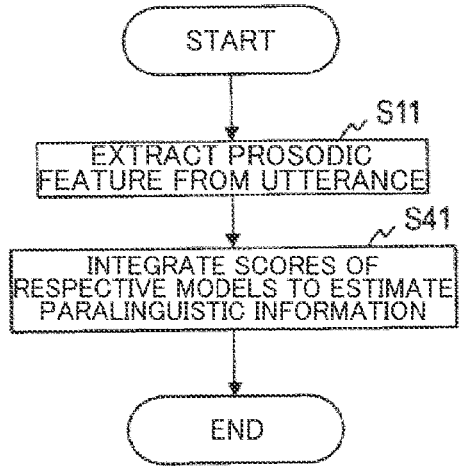
FIG. 9 is a diagram illustrating a processing procedure of a paralinguistic information estimation method according to the second embodiment.

A paralinguistic information estimation device according to the second embodiment estimates paralinguistic information of an input utterance by using both the learned anti-teacher estimation model and the traditional teacher estimation model. As illustrated in FIG. 8, a paralinguistic information estimation device 4 according to the second embodiment further includes a traditional teacher estimation model storage unit 40 and a paralinguistic information estimation unit 41 in addition to the acoustic feature extraction unit 11 and the anti-teacher estimation model storage unit 20 of the first embodiment. This paralinguistic information estimation device 4 implements a paralinguistic information estimation method according to the second embodiment by performing steps of processing by way of example illustrated in FIG. 9.

Hereinafter, the paralinguistic information estimation device 4 according to the second embodiment will be described with a focus on the differences from the paralinguistic information estimation device 2 according to the first embodiment.

The traditional teacher estimation model storage unit 40 stores the traditional teacher estimation model learned by the paralinguistic information estimation model learning device 3.

In step S41, the paralinguistic information estimation unit 41 estimates paralinguistic information from the prosodic feature output by the acoustic feature extraction unit 11 based on both the anti-teacher estimation model stored in the anti-teacher estimation model storage unit 20 and the traditional teacher estimation model stored in the traditional teacher estimation model storage unit 40. In the estimation, the paralinguistic information estimation unit 41 decides an estimation result of paralinguistic information based on a weight difference between the output of the traditional teacher estimation model and the output of the anti-teacher estimation model for a certain prosodic feature. This corresponds to performing paralinguistic information estimation in consideration of both "probability that certain paralinguistic information is correct" and "probability that certain paralinguistic information is incorrect".

The estimation of paralinguistic information is specifically expressed as follows.

$$\hat{c}_k = \underset{c_k}{\mathrm{argmax}}((1-\alpha)p(c_k) - \alpha q(c_k)) \quad \text{[Formula 3]}$$

Here, $\hat{c}_k$ represents a estimation result of paralinguistic information; $c_k$ represents the k-th paralinguistic information class; $p(c_k)$ represents the probability that the k-th paralinguistic information class is correct, and is also an output of the traditional teacher estimation model; $q(c_k)$ represents the probability that the k-th paralinguistic information class is incorrect, and is also an output of the anti-teacher estimation model; and a represents an estimation weight.

The estimation weight a is any value of continuous values of 0 to 1. The closer the estimation weight is to 0, the more important the "probability that certain paralinguistic information is correct" is, and the closer it is to 1, the more important the "probability that certain paralinguistic information is incorrect" is. For example, the estimation weight is set to 0.3.

Modified Example of Second Embodiment

In the second embodiment, an example is described in which the anti-teacher estimation model learning unit and the traditional teacher estimation model learning unit are configured to perform completely separate processing. However, one learned estimation model may be used as initial values for the other estimation model to learn the respective estimation models. Specifically, the anti-teacher estimation model stored in the anti-teacher estimation model storage unit 20 is input to the traditional teacher estimation model learning unit 32. Then, the traditional teacher estimation model learning unit 32 sets the anti-teacher estimation model as the initial values for the traditional teacher estimation model. Then, the traditional teacher estimation model learning unit 32 learns the traditional teacher estimation model based on the prosodic feature output by the acoustic feature extraction unit 11 and the traditional teacher label output by the traditional teacher decision unit 31. Alternatively, the traditional teacher estimation model stored in the traditional teacher estimation model storage unit 40 is input to the anti-teacher estimation model learning unit 13. Then, the anti-teacher estimation model learning unit 13 sets the traditional teacher estimation model as the initial values for the anti-teacher estimation model. Then, the anti-teacher estimation model learning unit 13 learns the anti-teacher estimation model based on the prosodic feature output by the acoustic feature extraction unit 11 and the anti-teacher label output by the anti-teacher decision unit 12. The traditional teacher estimation model and the anti-teacher estimation model learn the relevance between the prosodic feature and the traditional teacher or between the prosodic feature and the anti-teacher, respectively, and thus it is expected that the estimation criteria learned on one model is available on the other model. Accordingly, this additional processing may further improve the accuracy of paralinguistic information estimation.

Third Embodiment

In a third embodiment, paralinguistic information is estimated using a multi-task estimation model that estimates the traditional teacher estimation and the anti-teacher estimation at the same time. At this time, in the model learning, the traditional teacher estimation and the anti-teacher estimation are simultaneously learned as multi-task learning. It is known that in the multi-task learning, by solving different tasks with a single model, common knowledge can be acquired among the tasks, and the estimation accuracy of each task is improved (see Reference 1 below). The third embodiment is a paralinguistic information estimation using both the traditional teacher and the anti-teacher as in the second embodiment, but the estimation model itself can be improved by learning as the multi-task learning, thereby improving the estimation accuracy.

[Reference 1] R. Caruana, "Multitask Learning", Machine Learning, vol. 28, pp. 41-75, 1997.

<Paralinguistic Information Estimation Model Learning Device 5>

Figure 10:
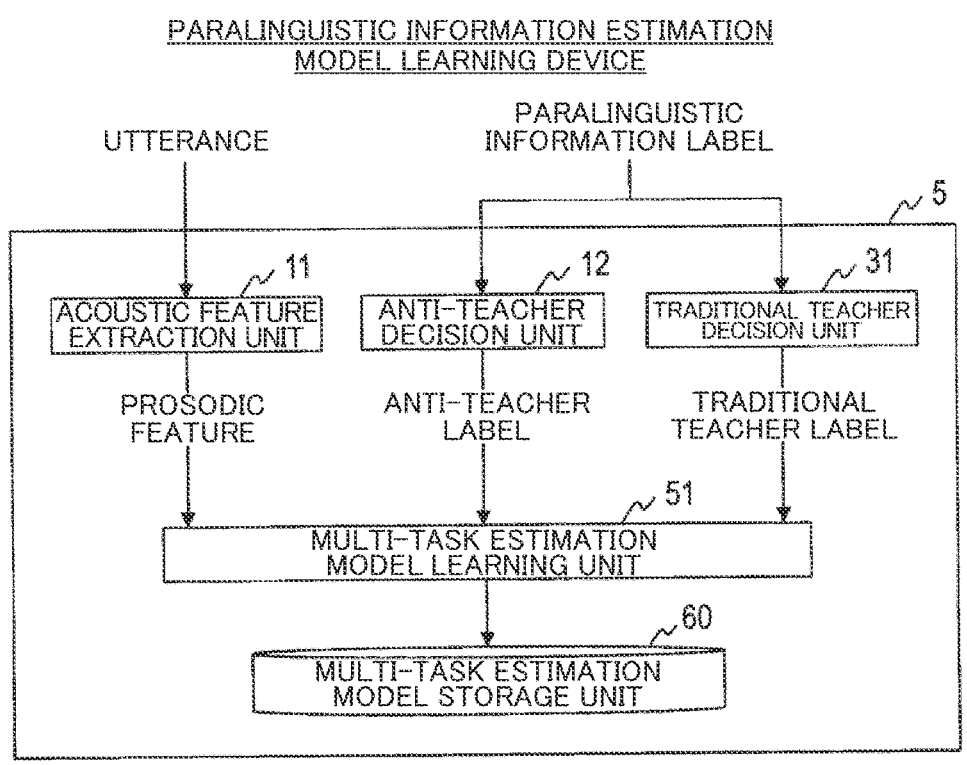
FIG. 10 is a diagram illustrating a functional configuration of a paralinguistic information estimation model learning device according to a third embodiment.
Figure 11:
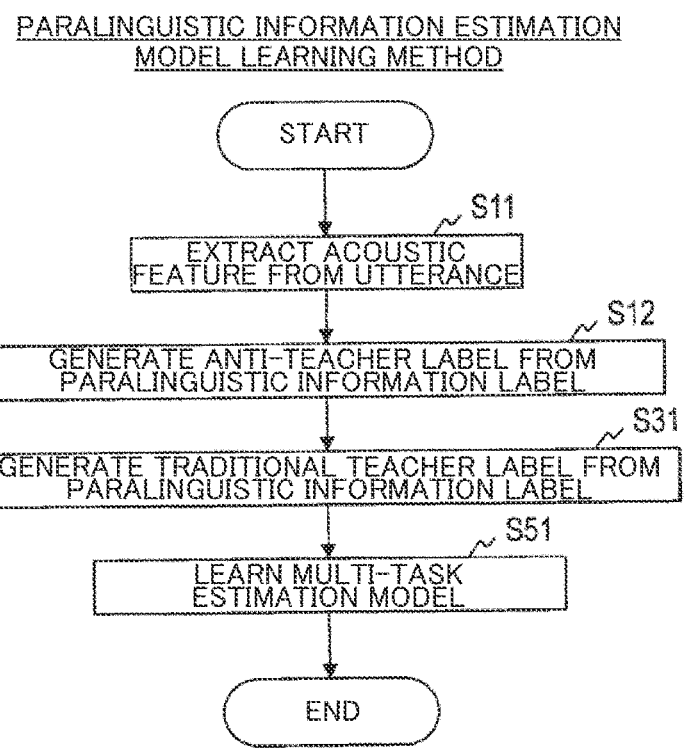
FIG. 11 is a diagram illustrating a processing procedure of a paralinguistic information estimation model learning method according to the third embodiment.

A paralinguistic information estimation model learning device according to the third embodiment learns the multi-task estimation model from the same learning data as in the first embodiment. As illustrated in FIG. 10, a paralinguistic information estimation model learning device 5 according to the third embodiment further includes a multi-task estimation model learning unit 51 and a multi-task estimation model storage unit 60 in addition to the acoustic feature extraction unit 11 and the anti-teacher decision unit 12 of the first embodiment, and the traditional teacher decision unit 31 of the second embodiment. This paralinguistic information estimation model learning device 5 implements a paralinguistic information estimation model learning method according to the third embodiment by performing steps of processing by way of example illustrated in FIG. 11.

Hereinafter, the paralinguistic information estimation model learning device 5 according to the third embodiment will be described with a focus on the differences from the paralinguistic information estimation model learning device 1 according to the first embodiment and the paralinguistic information estimation model learning device 3 according to the second embodiment.

In step S51, the multi-task estimation model learning unit 51 uses the prosodic feature output by the acoustic feature extraction unit 11, the anti-teacher label output by the anti-teacher decision unit 12, and the traditional teacher label output by the traditional teacher decision unit 31 to perform the multi-task learning and thus to learn the multi-task estimation model. Since an estimation model based on a neural network is generally used in the multi-task learning, the estimation model in the present embodiment is also an estimation model based on a neural network. For example, as illustrated in FIG. 10, the estimation model is an estimation model in which a branch structure for estimating the anti-teacher is added to the estimation model that is based on the deep learning of the conventional technique. The multi-task estimation model learning unit 51 stores the learned multi-task estimation model in the multi-task estimation model storage unit 60.

<Paralinguistic Information Estimation Device 6>

Figure 12:
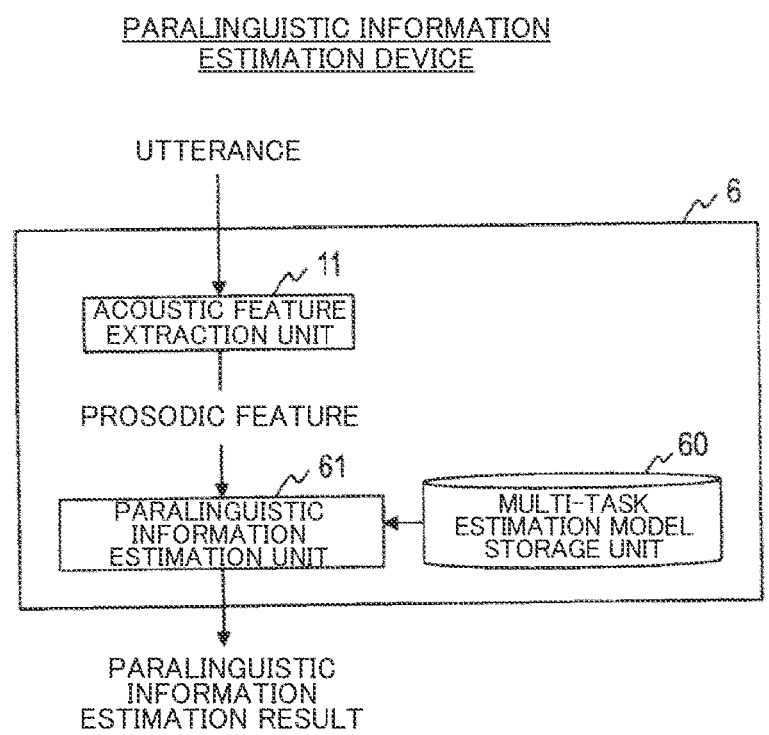
FIG. 12 is a diagram illustrating a functional configuration of a paralinguistic information estimation device according to the third embodiment.
Figure 13:
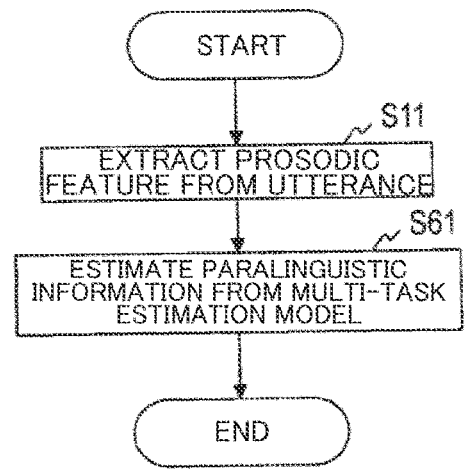
FIG. 13 is a diagram illustrating a processing procedure of a paralinguistic information estimation method according to the third embodiment.
Figure 14:
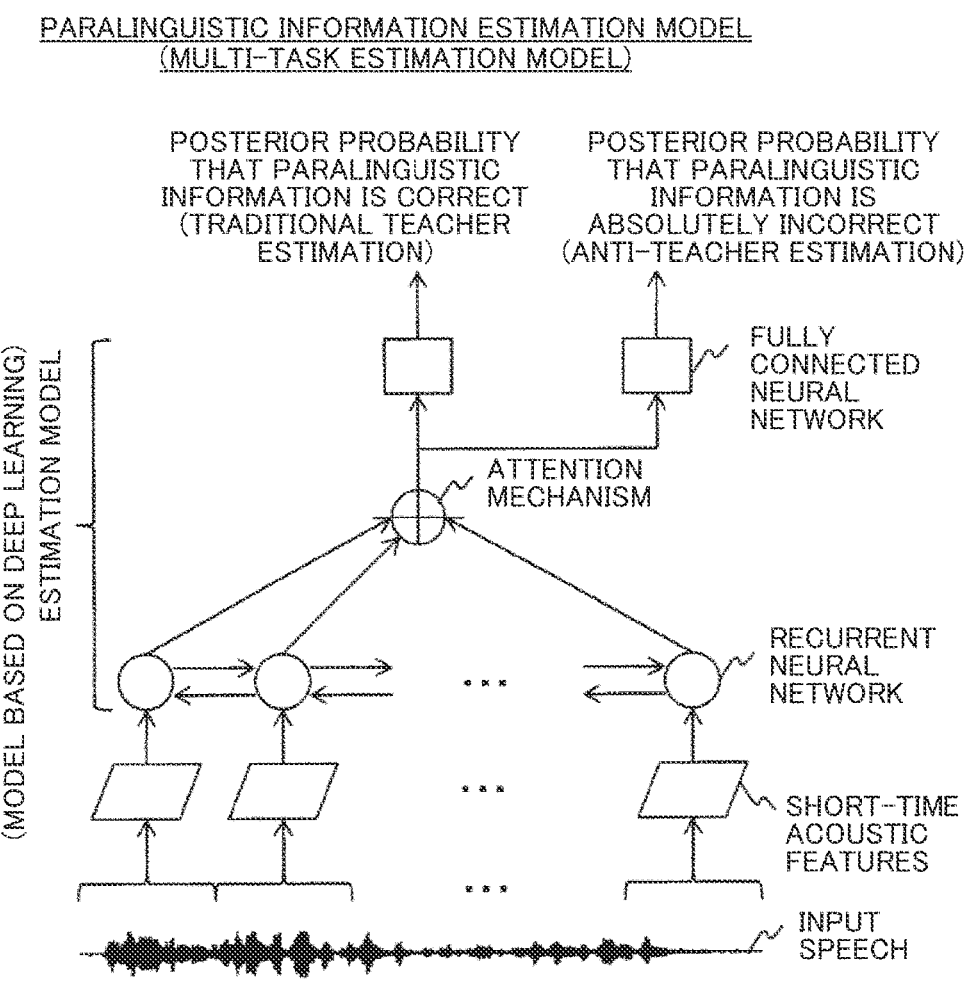
FIG. 14 is a diagram for explaining a paralinguistic information estimation model according to the third embodiment.

A paralinguistic information estimation device according to the third embodiment estimates paralinguistic information of an input utterance by using the learned multi-task estimation model. As illustrated in FIG. 12, a paralinguistic information estimation device 6 according to the third embodiment further includes a multi-task estimation model storage unit 60 and a paralinguistic information estimation unit 61 in addition to the acoustic feature extraction unit 11 of the first embodiment. This paralinguistic information estimation device 6 implements a paralinguistic information estimation method according to the third embodiment by performing steps of processing by way of example illustrated in FIG. 13.

Hereinafter, the paralinguistic information estimation device 6 according to the third embodiment will be described with a focus on the differences from the paralinguistic information estimation device 2 according to the first embodiment and the paralinguistic information estimation device 4 according to the second embodiment.

The multi-task estimation model storage unit 60 stores the multi-task estimation model learned by the paralinguistic information estimation model learning device 5.

In step S61, the paralinguistic information estimation unit 61 estimates paralinguistic information from the prosodic features output by the acoustic feature extraction unit 11 based on the multi-task estimation model stored in the multi-task estimation model storage unit 60. In the estimation, the class with the highest estimation output of the traditional teacher for a certain prosodic feature is regarded as a paralinguistic information estimation result. Since the multi-task learning is used in the learning of the estimation model, it is possible to perform paralinguistic information estimation in consideration of the influence of the anti-teacher (i.e., the traditional teacher being estimated while not making a mistake in the anti-teacher), and thus to improve paralinguistic information estimation accuracy.

[Modified Examples]

In the above-described embodiments, an example is described in which the paralinguistic information estimation model learning device and the paralinguistic information estimation device are configured as separate devices. However, in the embodiments of the present invention, alternatively, a single paralinguistic information estimation device may be configured to have a function of learning a paralinguistic information estimation model and a function of estimating paralinguistic information using the learned paralinguistic information estimation model. Specifically, a paralinguistic information estimation device according to a modified example of the first embodiment includes the acoustic feature extraction unit 11, the anti-teacher decision unit 12, the anti-teacher estimation model learning unit 13, the anti-teacher estimation model storage unit 20, and the paralinguistic information estimation unit 21. Further, a paralinguistic information estimation device according to a modified example of the second embodiment further includes the traditional teacher decision unit 31, the traditional teacher estimation model learning unit 32, the traditional teacher estimation model storage unit 40, and the paralinguistic information estimation unit 41 in addition to the acoustic feature extraction unit 11, the anti-teacher decision unit 12, the anti-teacher estimation model learning unit 13, and the anti-teacher estimation model storage unit 20. Furthermore, a paralinguistic information estimation device of a modified example of the third embodiment further includes the multi-task estimation model learning unit 51, the multi-task estimation model storage unit 60, and the paralinguistic information estimation unit 61 in addition to the acoustic feature extraction unit 11, the anti-teacher decision unit 12, and the traditional teacher decision unit 31.

In the embodiments of the present invention described above, needless to say, a specific configuration is not limited to these embodiments, and even a design and the like appropriately changed without departing from the spirit and scope of the present invention is included in the present invention. The various types of processing described in the embodiments may not only be executed in chronological order according to the description, but may also be executed in parallel or individually as required or depending on the processing capacity of the device that executes the processing.

[Program and Recording Medium]

When various processing functions in each device described in the above embodiments are implemented by a computer, the processing contents of the functions to be included in each device are described by a program. Then, by executing this program on a computer, various processing functions of the above-described devices are implemented on the computer.

The program(s) describing the processing contents can be recorded in a computer-readable recording medium. The computer-readable recording medium may be anything, for example, a magnetic recording device, an optical disc, a magneto-optical recording medium, or a semiconductor memory.

Further, the distribution of this program is performed by selling, transferring, or lending a portable recording medium such as a DVD or a CD-ROM in which the program is recorded. Furthermore, the program may be stored in a storage device of a server computer so that the program can be distributed by being transferred from the server computer to another computer via a network.

A computer that executes such a program first stores, for example, the program recorded on a portable recording medium or the program transferred from the server computer in its own storage device. Then, when processing is executed, the computer reads the program stored in its own storage device and executes the processing according to the read program. Further, as another execution form of this program, a computer may directly read the program from a portable recording medium and execute processing according to the program, and each time the program is transferred from a server computer to this computer, the computer may further sequentially execute processing according to the received program. In addition, a configuration may be provided in which a so-called ASP (Application Service Provider) service, which implements the processing functions only by an instruction of execution and acquisition of the result without transferring the program from the server computer to this computer, executes the above-described processing. Note that the program in the present embodiment includes information used for processing by a computer and equivalent to the program (e.g., data that is not a direct command to the computer but has a property of defining processing on the computer).

Further, although the device is implemented by executing a predetermined program on a computer in this embodiment, at least a part of these processing contents may be realized by hardware.

REFERENCE SIGNS LIST 1, 3, 5 Paralinguistic information estimation model learning device
11 Acoustic feature extraction unit
12 Anti-teacher decision unit
13 Anti-teacher estimation model learning unit
20 Anti-teacher estimation model storage unit
31 Traditional teacher decision unit
32 Traditional teacher estimation model learning unit
40 Traditional teacher estimation model storage unit
51 Multi-task estimation model learning unit
60 Multi-task estimation model storage unit
2, 4, 6 Paralinguistic information estimation device
21, 41, 61 Paralinguistic information estimation unit

The invention claimed is:

1. A paralinguistic information estimation model learning device comprising:
an anti-teacher determiner configured to determine, based on a paralinguistic information label indicating a determination result of paralinguistic information given by a plurality of listeners for each utterance, an anti-teacher label indicating an anti-teacher serving as incorrect paralinguistic information for the utterance;
an anti-teacher estimation model learner configured to learn, based on an acoustic feature extracted from the utterance and the anti-teacher label, an anti-teacher estimation model,
wherein the anti-teacher estimation model, subsequent to the learning, estimates a posterior probability of anti-teacher from an acoustic feature of an input utterance to further estimate paralinguistic information of the input utterance based on the posterior probability.

2. The paralinguistic information estimation model learning device according to claim 1, further comprising:
a traditional teacher determiner configured to determine, based on the paralinguistic information label, a traditional teacher label indicating a traditional teacher serving as correct paralinguistic information for the utterance; and
a traditional teacher estimation model learner configured to learn, based on an acoustic feature extracted from the utterance and the traditional teacher label, a traditional teacher estimation model for outputting a posterior probability of traditional teacher for an input acoustic feature.

3. The paralinguistic information estimation model learning device according to claim 1, wherein the paralinguistic information includes one or more of emotions being joy, sadness, anger, or calm from the utterance.

4. The paralinguistic information estimation model learning device according to claim 1, wherein the anti-teacher includes a piece of paralinguistic information determined by a group of listeners, and wherein a number of listeners in the group of listeners is less than a threshold as compared to a number of the plurality of listeners.

5. A paralinguistic information estimation model learning device comprising:
an anti-teacher determiner configured to determine, based on a paralinguistic information label indicating a determination result of paralinguistic information given by a plurality of listeners for each utterance, an anti-teacher label indicating an anti-teacher serving as incorrect paralinguistic information for the utterance;
a traditional teacher determiner configured to determine, based on the paralinguistic information label, a traditional teacher label indicating a traditional teacher serving as correct paralinguistic information for the utterance;
a multi-task estimation model learner configured to learn a multi-task estimation model for outputting a posterior probability of anti-teacher and a posterior probability of traditional teacher for an input acoustic feature, based on an acoustic feature extracted from the utterance, the anti-teacher label, and the traditional teacher label,
wherein the multi-task estimation model, subsequent to the learning, estimates the posterior probability of anti-teacher from an acoustic feature of an input utterance to further estimate paralinguistic information of the input utterance.

6. The paralinguistic information estimation model learning device according to claim 5, wherein the multi-task estimation model is a model in which a branch structure for outputting the posterior probability of anti-teacher is added to a paralinguistic information estimation model that is based on deep learning for outputting the posterior probability of traditional teacher.

7. The paralinguistic information estimation model learning device according to claim 5, wherein the paralinguistic information includes one or more of emotions being joy, sadness, anger, or calm from the utterance.

8. The paralinguistic information estimation model learning device according to claim 5, wherein the anti-teacher includes a piece of paralinguistic information determined by a group of listeners, and wherein a number of listeners in the group of listeners is less than a threshold as compared to a number of the plurality of listeners.

9. A paralinguistic information estimation device comprising:
an anti-teacher estimation model store configured to store an anti-teacher estimation model learned by a paralinguistic information estimation model learning device, wherein the paralinguistic information estimation model learning device comprises:

an anti-teacher determiner configured to determine, based on a paralinguistic information label indicating a determination result of paralinguistic information given by a plurality of listeners for each utterance, an anti-teacher label indicating an anti-teacher serving as incorrect paralinguistic information for the utterance; and an anti-teacher estimation model learner configured to learn, based on an acoustic feature extracted from the utterance and the anti-teacher label, an anti-teacher estimation model for outputting a posterior probability of anti-teacher for an input acoustic feature; and a paralinguistic information estimator configured to estimate, based on a posterior probability of anti-teacher obtained by inputting an acoustic feature extracted from an input utterance into the anti-teacher estimation model, paralinguistic information of the input utterance.

10. The paralinguistic information estimation device according to claim 9, further comprising:

a traditional teacher estimation model store configured to store the traditional teacher estimation model learned by a paralinguistic information estimation model learning device, wherein the paralinguistic information estimation model learning device further comprising:

a traditional teacher determiner configured to determine, based on the paralinguistic information label, a traditional teacher label indicating a traditional teacher serving as correct paralinguistic information for the utterance; and a traditional teacher estimation model learner configured to learn, based on an acoustic feature extracted from the utterance and the traditional teacher label, a traditional teacher estimation model for outputting a posterior probability of traditional teacher for an input acoustic feature, and wherein the paralinguistic information estimation unit estimates the paralinguistic information of the input utterance based on a weight difference between the posterior probability of anti-teacher obtained by inputting the acoustic feature into the anti-teacher estimation model and the posterior probability of traditional teacher obtained by inputting the acoustic feature into the traditional teacher estimation model.

11. The paralinguistic information estimation device according to claim 9, wherein the paralinguistic information includes one or more of emotions being joy, sadness, anger, or calm from the utterance.

12. The paralinguistic information estimation device according to claim 9, wherein the anti-teacher includes a piece of paralinguistic information determined by a group of listeners, and wherein a number of listeners in the group of listeners is less than a threshold as compared to a number of the plurality of listeners.

\* \* \* \* \*